United States Patent

Baxter

[15] 3,673,322

[45] June 27, 1972

[54] FACSIMILE TRANSMISSION SYSTEM

[72] Inventor: Larry K. Baxter, Lexington, Mass.

[73] Assignee: Shintron Company, Inc., Cambridge, Mass.

[22] Filed: May 28, 1970

[21] Appl. No.: 41,496

[52] U.S. Cl. .......................................... 178/6

[51] Int. Cl. .......................................... H04n 1/00

[58] Field of Search ..........................178/6, 69; 179/2, 3, 4; 325/30, 66, 163, 136, 137, 138; 332/17

[56] References Cited

UNITED STATES PATENTS

| | | | |
|---|---|---|---|
| 3,336,445 | 9/1967 | Nakagawa | 179/4 |
| 3,436,474 | 4/1969 | Saeger et al. | 178/DIG. 3 |
| 3,406,383 | 10/1968 | McFarlane | 325/30 |
| 3,177,478 | 4/1965 | Hansel et al. | 178/67 |
| 3,160,812 | 12/1964 | Scantlin | 332/17 |

OTHER PUBLICATIONS

Single Sideband Principles & Circuits by E. W. Pappenfus et al. McGraw Hill Copy 1964 pages 24, 25, 26, 44, 45, 98, 99

*Primary Examiner*—Robert L. Griffin
*Assistant Examiner*—Barry Leibovoitz
*Attorney*—Wolf, Greenfield and Sacks

[57] ABSTRACT

A facsimile transmission system employs a rotating drum at the transmitter upon which the original document is mounted and a synchronously rotating drum at the receiver having marking means for producing the facsimile. "Video" signals obtained by scanning the original document with a photosensitive device are made to modulate a carrier to convey black and white information by the relative proportions of 0° and 180° phases in the modulated carrier while the shade of black or white is conveyed by the amplitude of the modulated carrier. At the receiver, the modulated carrier is synchronously demodulated to recreate the video signals which are then used to control the marking means so as to produce a facsimile of the original document.

5 Claims, 6 Drawing Figures

INVENTOR
Larry K. Baxter
BY
Wolf, Greenfield, Hieken & Sacks

Patented June 27, 1972

3,673,322

3 Sheets-Sheet 2

INVENTOR
Larry K. Baxter
BY
Wolf Greenfield Hieken + Sacks

Patented June 27, 1972

3,673,322

3 Sheets-Sheet 3

INVENTOR
Larry K. Baxter
BY
Wolf, Greenfield, Hieken & Sacks

FACSIMILE TRANSMISSION SYSTEM

FIELD OF THE INVENTION

The present invention relates in general to facsimile transmission systems and more particularly concerns a novel facsimile transmission system of high performance and excellent reproducability.

BACKGROUND OF THE INVENTION

In conventional facsimile transmission systems a document containing information to be transmitted is wrapped around a rotatable drum. While the drum is rotating, a photosensitive device scans the surface of the paper sensing the dark and light portions. This "video" information is converted into an electrical signal and transmitted on a carrier signal, usually over telephone lines, to a receiving station. The receiving station has a like rotatable drum with electrosensitive paper as for example Teledeltos paper. The received signal, in the conventional system, is employed to maintain the drum at the receiving station in synchronism with the drum at the transmitter. However, frequency shifts, caused by internal components in the telephone lines, introduce disturbing effects which interfere with the synchronizing signals. The video information in the transmitted signal is recovered, by demodulating the received signal, and is applied to an electrical stylus which marks the electrosensitive paper to produce a copy at the receiver of the original documents. Because of the manner in which the video information is transmitted, some of the video information tends to be lost when transmitted over noisy lines or the signals require a large bandwidth which is unsuited to transmission over telephone lines.

In these facsimile transmission systems, an a-c synchronous motor typically drives the drum holding both the original document and the electrosensitive paper. These motors require relatively high power, are relatively slow starting, and the requirement for a-c power presents disadvantages in a battery-powered portable facsimile transmission system.

OBJECTS OF THE INVENTION

The principal objective of the invention is to provide an improved facsimile transmission system which can reliably transmit facsimile data over telephone lines. In the improved system, video information and synchronizing information are transmitted by signals occupying a narrow bandwidth. Further, the transmitted signals are modulated in a manner making them markedly insensitive to telephone line noise and distortion. Information signals obtained from the original document are made to modulate a carrier to cause the information to be carried by the relative proportions of 0° and 180° carrier phases.

A further object of the invention is to provide a facsimile transmission system which transmits information relatively quickly and does not require direct electrical connection to the telephone lines. In the invention, the input to the telephone lines is an acoustic tone signal.

Other objects of the invention are to provide a facsimile transmission system which (1) utilizes relatively low power, (2) is fast starting, (3) can be transported in the field, (4) can be operated from a battery or mobile power source, and (5) is operative over a broad range of environmental conditions.

A further object of the invention is to provide a facsimile transmission system employing a finely spaced dual stylus which improves the apparent resolution of the facsimile by marking upon an electrosensitive paper.

SUMMARY OF THE INVENTION

According to the invention, a facsimile system is provided in which the original document is mounted on a cylindrical drum driven at a constant speed by a d-c motor. A crystal controlled oscillator regulates the speed of the motor. As the drum rotates, a photosensitive element, as for example, a phototransistor senses the information on the original document and converts the information into an electrical signal representative thereof. The electrical signal provides a modulating signal for a balanced modulator which also receives a carrier signal derived from the crystal controlled oscillator. The suppressed carrier amplitude modulated signal is transmitted to a receiving station, preferably over telephone lines.

With respect to the transmitted suppressed carrier amplitude modulated signal, white portions of the original document may be represented as a modulated wave of 0° phase and the black portions as an equal amplitude signal of 180° phase. A preamplifier and frequency doubler with a phase lock loop comprise the input circuit for the receiving station. The received signal is then synchronously demodulated, yielding a series of positive signals representative of black information on the original document and a series of negative signals representative of white information on the original document. Crystal controlled oscillators regulate the speed of d-c motors which drive the drums at the transmitter and the receiver. The crystal controlled oscillators in the transmit and receive stations provide essentially the same frequency to cause the drums to rotate in synchronism.

In a modification of the invention, a double stylus is used in the writing mode in the receive station. Each stylus may be driven independently and the styli may be placed at a center to center spacing of half the normal line pitch to achieve an apparent fine scan.

BRIEF DESCRIPTION OF THE DRAWING

The invention, both as to its arrangement and mode of operation, can be better understood from the following specification when read in connection with the accompanying drawing in which.

DETAILED DESCRIPTION OF THE PREFERRED EMBODIMENTS

Figure 1:
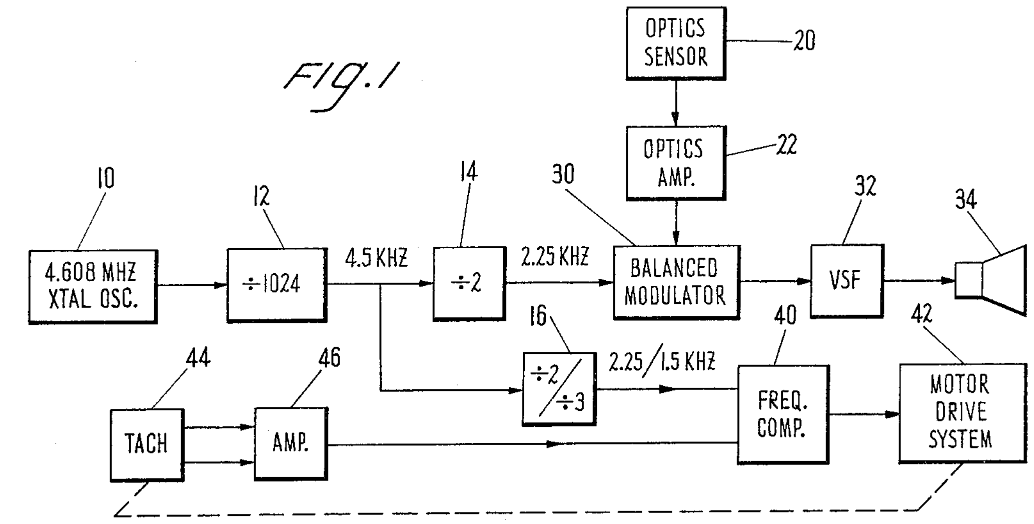
FIG. 1 is a block diagram of the invention illustrating the operation in the transmit mode.

With reference now to the drawings and more particularly to FIG. 1 thereof, there is shown a block diagram of the invention illustrating the transmit mode of operation. It is to be understood that the original document is mounted on a rotatable cylindrical drum and the document is scanned by the optical sensor 20 in the customary manner. The optical sensor has a photosensitive device which emits electrical signals in response to the amount of light directed onto it by the optics in the sensor. As the signal from the photosensitive device is usually small, the optical sensor also carries in it a preamplifier which amplifies the signals from the photosensor. The signals from the preamplifier are transmitted to an amplifier 22 and that amplified signal is utilized as the modulating input signal to balanced modulator 30. On the drum is a highly reflective metal strip which guarantees that a maximum white signal is produced at least once during each revolution of the drum.

The signal from the preamplifier varies from a maximum positive level for white to a maximum negative level for black. For gray shades, the signal level lies between the maximum positive and maximum negative signal levels. For one gray shade, the signal level is zero and when that shade occurs there is no output from the modulator 30 as the carrier is entirely suppressed when the modulating signal input to the modulator is zero. That is, the signal from amplifier 22 must unbalance the modulator in order for any signal to appear at the modulator's output. The amplitude of the signal appearing at the output of the modulator is governed by the level of the signal from the amplifier 22 which in turn depends upon whether the optics sensor is scanning a white, black, or gray area of the original document. Gray shades which are lighter than the zero level gray shade (i.e., whitish grays) result in a signal output from the modulator having 0° phase whereas gray shades which are darker than the zero level gray (i.e., blackish grays) result in a signal output from the modulator having 180° phase. Therefore, the phase of the transmitted signal indicates whether the information is black ro white while the amplitude of the signal indicates the shade of whiteness or blackness of the information. To recover the transmitted information at the receiver, it is necessary to determine which of the two maximum levels represents maximum white. The guaranteed white signal, which is transmitted at least once for each rotation of the transmitter's drum, is a periodically recurring signal which provides the necessary information to permit the receiver to distinguish the level representing maximum white from the level representing maximum black.

A crystal controlled oscillator 10 supplies the carrier signal through a divider chain to balanced modulator 30. The crystal controlled oscillator output signal is first counted down by divider 12 to yield a 4.5 $KH_Z$ signal. The 4.5 $KH_Z$ signal then supplies the input signal for another divider 14 which yields the 2.25 $KH_Z$ signal which provides the carrier signal for the balanced modulator 30. The balanced modulator, in response to its input signals, emits a suppressed carrier amplitude modulated signal which is coupled to vestigial sideband filter 32. The filtered signal is then converted into an audio tone by speaker 34.

The 4.5$KH_Z$ signal from divider 12 also provides the input signal for divider 16 in the motor control system. The output signal from divider 16 is compared in frequency comparator 40 with a second signal representative of drum speed derived from motor tachometer 44 and amplifier 46. The difference frequency signal from frequency comparator 40 provides the input signal for the motor drive system 42 to maintain the drum speed, substantially constant.

Figure 2:
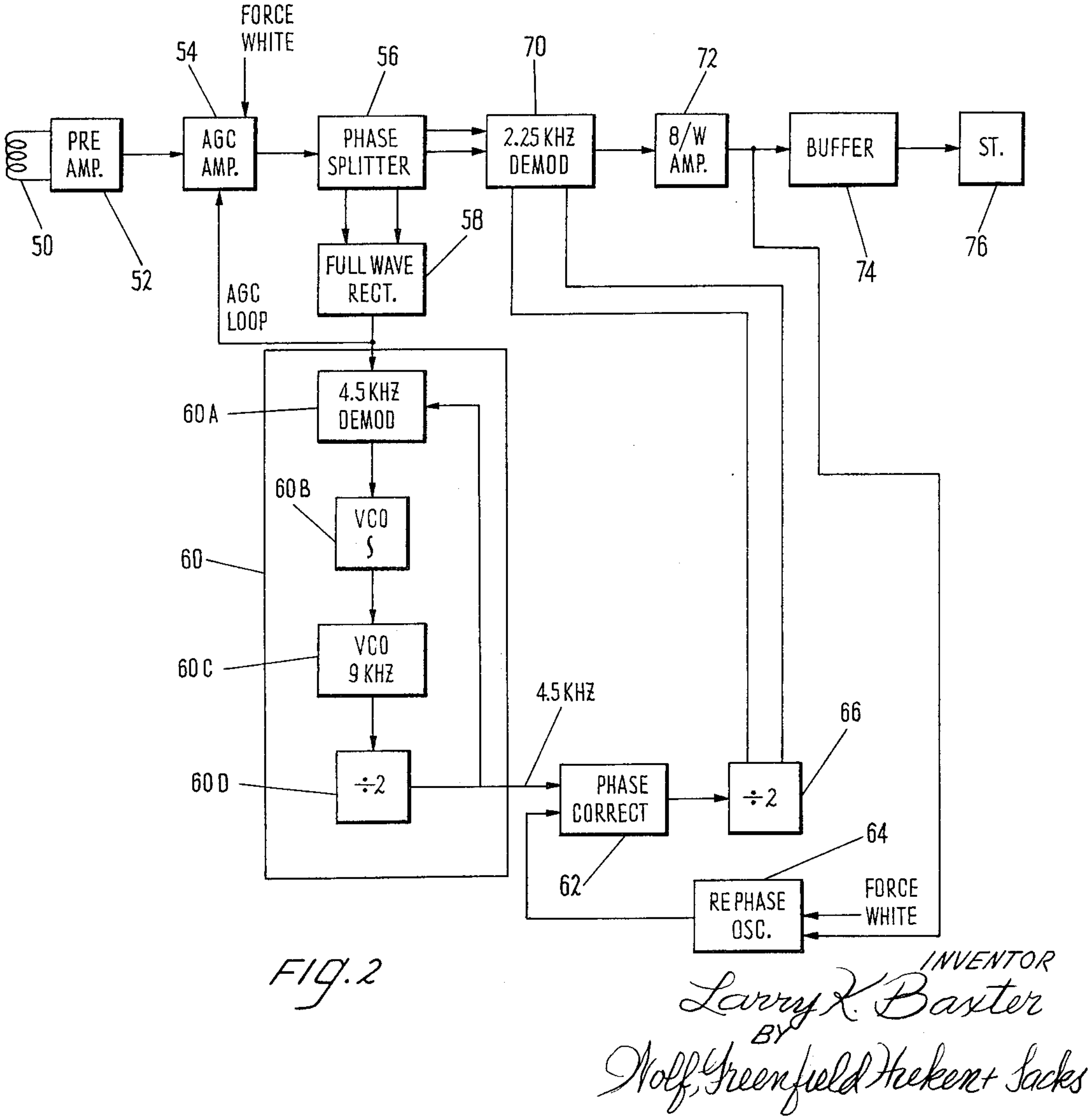
FIG. 2 is a block diagram of the invention illustrating the operation in the receive mode.

FIG. 2 is a block diagram of the invention illustrating the scheme of the receiver of the system. The audio tone produced by the FIG. 1 transmitter is transmitted over telephone lines to the receiver. At the receiver, a magnetic pickup 50 reconverts the audio tone into an electrical signal (a suppressed carrier amplitude modulated signal). The reconverted signal is amplified by preamplifier 52 and is impressed upon an automatic gain control loop which includes automatic gain control amplifier 54, phase splitter 56, and full wave rectifier 58. The rectified signal from full wave rectifier 58 controls the gain of automatic gain control amplifier 54 in the conventional manner.

The signal from full wave rectifier 58 is stabilized by voltage control oscillator system 60 which includes a demodulator 60A, an integrator 60B, an oscillator 60C and a divider 60D. The oscillator system yields a 4.5 $KH_Z$ signal which feeds phase correct portion 62. Phase correct portion 62 is also fed by a signal from rephase oscillator 64. As the transmit and receive drums rotate, a signal guaranteed to be white is transmitted at least once each revolution through optical, mechanical or electrical apparatus coupled to the drum. At the receiver, a "force white" signal is generated at least once during each rotation of the receiver drum. Where the transmitter and receiver drums are synchronized and in phase, the "force white" signal generated at the receiver occurs in phase with the received guaranteed white signal. Rephase oscillator 64 examines the signal from B/W amplifier 72, which is indicative of the phase of the input signal during the time (force white) that the signal should be 0° phase (i.e., guaranteed white), and emits a "phase correct" signal to phase correct portion 62 if the phase of the received 2.25 $KH_Z$ received synchronizing signal does not correspond to the phase of the "force white" signal applied to the rephase oscillator. The "force white" signal also applies a bias to AGC amplifier 54 to cause its gain to be set at a predetermined value during the time the phase comparison is made by the rephase oscillator. The corrected signal from unit 62 feeds divider 66 which yields a 2.25 $KH_Z$ signal to provide one input for demodulator 70. This synchronizing signal, along with the signal from phase splitter 56, feed demodulator 70 where the 2.25 $KH_Z$ carrier is removed, yielding the video signal representative of the copy to be reproduced.

The rephase oscillator 64 essentially comprises a comparator having its output coupled to a monostable multivibrator. The comparator compares the amplitude of the signal from B/W amplifier 72 with the amplitude of the "force white" signal. Where both of the input signals to the comparator are of the same polarity and the same amplitude, no signal is emitted by the comparator. Where, however, the signal from B/W amplifier 72 is below the level of the "force white" signal, the comparator emits a signal which triggers the monostable multivibrator and the multivibrator thereupon generates a pulse which is applied to the phase correct unit 62. The phase correct unit 62 and the divider 66 can, for example, be united in a J–K flip-flop (e.g., a Fairchild type 9923 J–K flip-flop) having the 4.5 $KH_Z$ signal applied to its toggle (C) input. Thus, the output of the J–K flip-flop is a 2.25 $KH_Z$ signal. The pulse output of the monostable multivibrator of rephase oscillator 64 is applied to the preset (P) input of the J–K flip-flop. When that multivibrator emits a pulse to the J–K flip-flop, the state of the flip-flop is altered and the phase of the flip-flop's output signal changes by 180° Thereby, the synchronizing signal to demodulator 70 has the correct phase relative to the received signal. Where the synchronizing signal has the incorrect phase, the facsimile will be an inverted image of the original inasmuch as blacks will reproduce as whites and whites will reproduce as blacks. It can be seen that an important aspect of the invention is the phase locking of the black and white signals (which are transmitted in amplitude modulated suppressed carrier form) and that the phase locking is achieved principally through the transmission of a signal guaranteed to be white at least once every revolution of the drum. The video signal, from demodulator 70, provides the input for black/white amplifier 72, buffer amplifier 74 and the stylus driver and assembly 76. The stylus driver and assembly 76, hereafter explained in detail, is adapted for marking the electrosensitive paper mounted on the rotating drum of the receiver.

As in the transmitter, a crystal controlled oscillator and an associated comparison system regulate the d-c motor speed in the receiver. Since the crystal controlled oscillators may be regulated within 20 parts per million and the positions of the revolving drums may be accurately determined by suitable transducers, the speeds of the drums and the relative positions of the drums may be synchronized with sufficient precision to insure accurate reproduction. Means (not shown) are provided to insure that the drums stop in a predetermined position. From the stationary positions, both drums accelerate at the same rate to full speed. Thus, when the transmitter and receiver drums are simultaneously started from their rest positions, the drums rotate in synchronism and maintain that synchronism sufficiently to produce accurate facsimiles.

Figure 3:
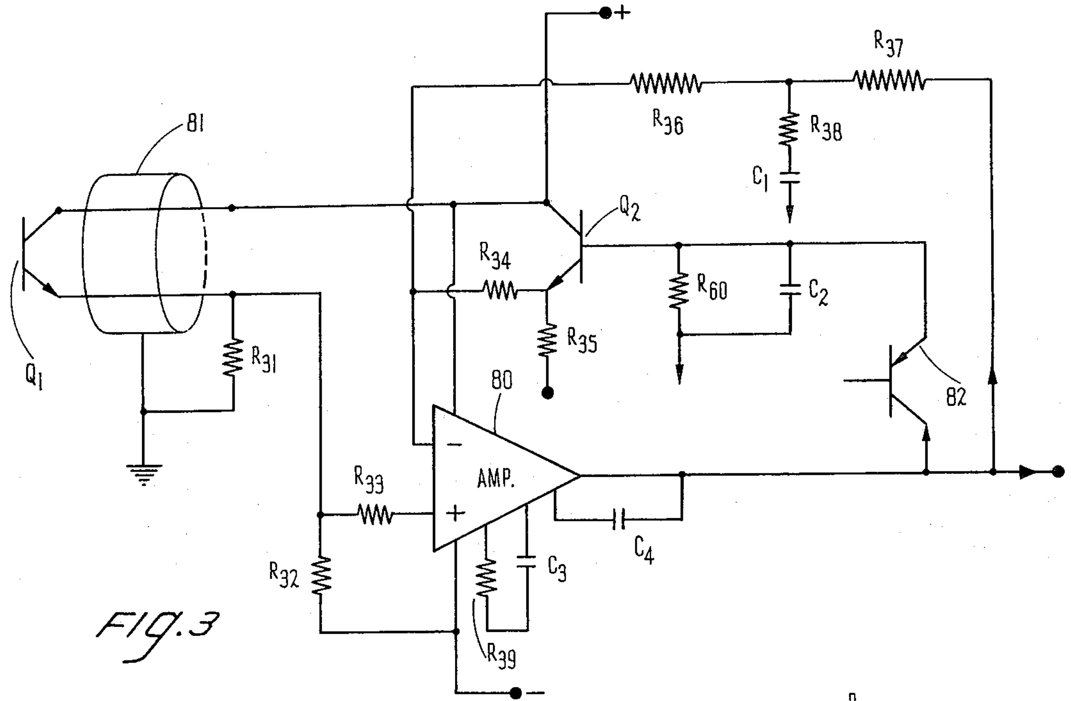
FIG. 3 is a schematic circuit diagram of the optic sensor and preamplifier according to the invention.

With reference to FIG. 3, there is shown a schematic circuit diagram of the optic sensor and preamplifier according to the invention. Light sensitive device Q1, as for example a phototransistor, senses variations in intensity of light and converts these variations into an electrical signal. The electrical signal emitted by phototransistor Q1 is transmitted by a shielded line 81 and resistor R33 to the input terminal of amplifier 80.

Amplifier 80, as for example an integrated circuit type 709 amplifier, is biased at a positive and negative 12 volt level and has frequency compensating elements $R_{39}$, $C_3$ and $C_4$ coupled to it. The output signal from amplifier 80 is coupled back to the amplifier in two parallel feedback paths. One path comprises transistor 82, emitter follower $Q_2$ and series resistor R34. In addition, the shunt parallel combination of resistor R60 and capacitor $C_2$ interconnects transistors 82 and $Q_2$. The other feedback path comprises a T filter combination of resistors R36, R37 and R38 and capacitor C1. Transistor 82 acts as a double opposing diode combination, one diode of the combination acting as a Zener diode to clamp the most positive portion of the wave.

Since the most positive portion of the wave corresponds to the lightest portion of information sensed by phototransistor 21, the white portion of the information sensed is represented by the clamping level of the Zener diode (i.e., transistor 82). Furthermore, capacitor C2 charges to the clamping level of the Zener diode portion of transistor 82. The positive diode portion of transistor 82 prevents the dark signal (the black portion) sensed by phototransistor $Q_1$ from setting the clamping level for the feedback loop. The parallel path including the RC filter provides frequency compensation for the preamplifier. From the foregoing, it can be appreciated that the preamplifier clamps the lightest portion of the information sensed by the phototransistor in the sensor to a set level so that the lightest portion is transmitted as white regardless of the reflectivity of the paper.

Figure 4:
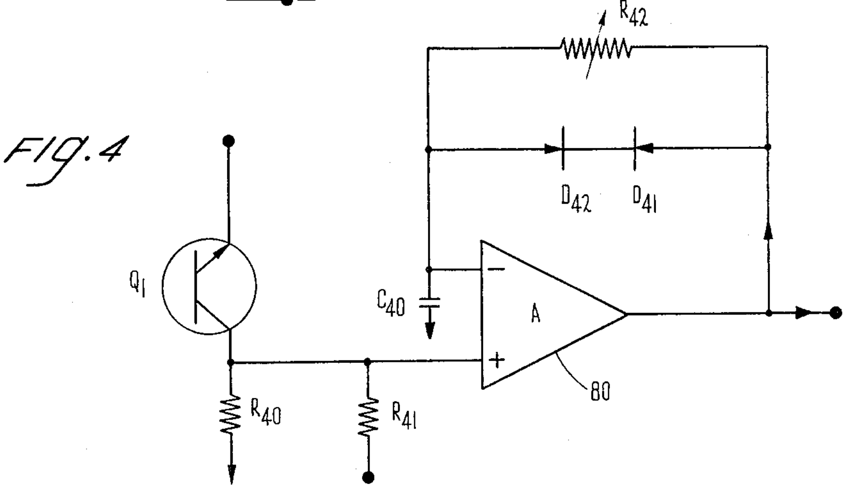
FIG. 4 is a schematic circuit diagram of a simplified optic sensor and preamplifier according to the invention.

FIG. 4 illustrates another embodiment of the optic sensor and preamplifier in which the feedback portions are simplified. In this configuration, there is again a phototransistor $Q_1$ and an amplifier 80. The Zener diode D42 in the feedback loop of amplifier 80 establishes an output level of +5 volts which corresponds to the whitest portion of the information sensed by phototransistor $Q_1$. Thus, the whitest part of the object to be transmitted is normalized at +5 volts d-c regardless of the reflectivity of the object. Variable resistor R42 is used to establish a gain set level for the amplifier.

Figure 5:
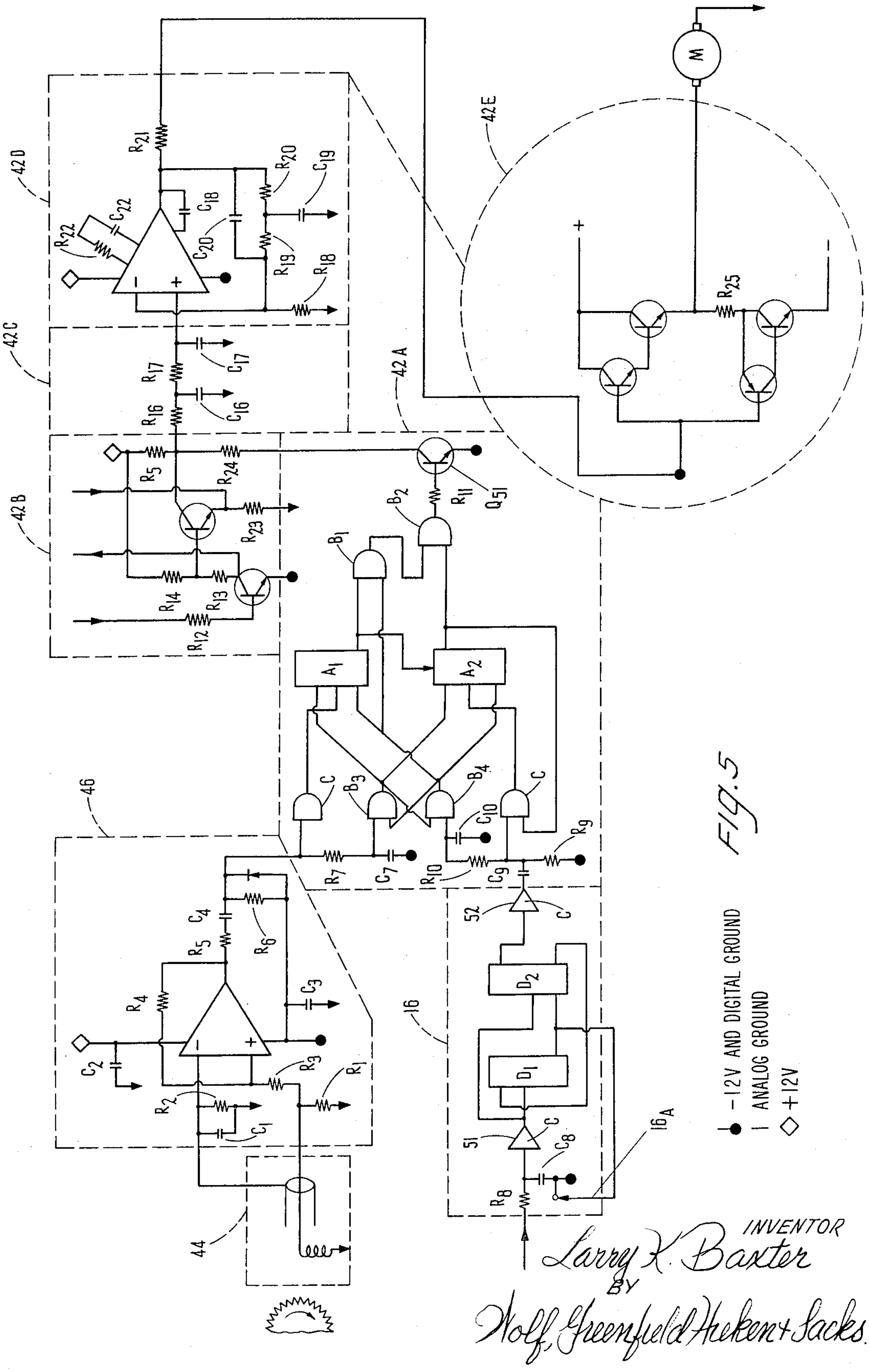
FIG. 5 is a schematic diagram of the d-c motor control circuit according to the invention.

FIG. 5 is a combined block-schematic circuit diagram of the d-c motor control board according to the invention. Divider 16 receives the counted down signal from crystal controlled oscillator 10 (see FIG. 1). The input signal is transformed into pulses by the RC filter combination of resistor $R_8$ and capacitor $C_8$ and amplified by inverter 51. The pulse signal then provides the input for the combination of flip-flops D1 and D2. Flip-flops D1 and D2 divide by two or divide by three in accordance with switch selectable combinations, the quotient being chosen by operation of speeds switch 16A. The output signal is then further amplified by inverter 52 and capacitively coupled through $C_9$ to frequency and phase comparator 42A.

The signal from tachometer 44, which is a measure of drum speed, is amplified by amplifier 46, providing a train of input signal pulses for frequency and phase comparator 42A. When the motor accelerates past the required speed (the tachometer frequency being greater than the input frequency of 2.25 or 1.5 $KH_Z$), the frequency of the pulses from amplifier 46 will be greater than those from divider 16. Flip-flop A1 of the frequency and phase comparator 42A then sets, resetting flip-flop A2, thus turning off the voltages to the motor. The motor then decelerates to the proper speed. At this speed, gates B3 and B4, connected as a set-reset flip-flop, produce a rectangular wave whose duty cycle is proportional to the phase difference between motor "tach" pulses and input pulses. This signal passes through gates B1 and B2 and is then amplified by transistor Q51, filtered by RC filter 42C, amplified by amplifier 42D and then applied to the motor power amplifier 42E. Thus, a closed servo-loop is formed to control the motor speed and phase. Control circuitry 42B is adapted for controlling the drum position and starting the motor.

Figure 6:
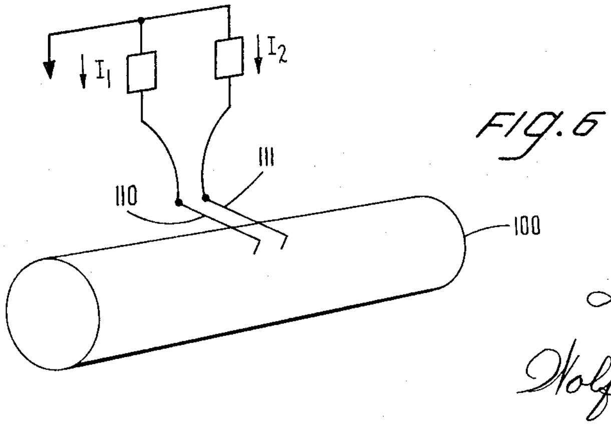
FIG. 6 is a schematic representation of the double stylus according to the invention.

FIG. 6 is a schematic representation of a double stylus system according to the invention. To prevent the rather coarse (88 lines per inch) scan from being visible as discrete lines on the Teledeltos paper, dual styli 110 and 111 may be positioned with a center-to-center spacing of 0.006 inch and adjusted for writing on electrosensitive paper placed upon drum 100. Moreover, the styli may be driven independently by current sources, such as $I_1$ and $I_2$, at a high frequency so as to achieve the effect of a continuous presentation. The independent current sources may be provides by step-up transformers and the frequency may be in the high audio range, as for example 4.5 $KH_Z$.

Although only the preferred embodiment of the invention has been illustrated and described, it is apparent that the invention can take different forms. For example, in the preferred embodiment, D.C. motors are employed which are precisely controlled in speed. It is obvious to those skilled in the art, that the D.C. motors can be replaced by A.C. synchronous motors and that the existing crystal oscillator and divider devices can be utilized to provide the stable and accurate signals required for those motors. Further, in lieu of using a phototransistor in the optical sensor, other transducing devices which convert light to electrical signals can be utilized.

The invention is illustrated with a crystal controlled oscillator of 4.608 $MH_Z$. This frequency was chosen mainly because of the availability and reliability of such oscillators. The invention works well with any other type of crystal oscillator or suitably regulated oscillator which may be adapted to yield a frequency in the audio range.

Other modifications and uses of and departures from the specific embodiments described herein may be practiced by those skilled in the art without departing from the inventive concepts. Consequently, the invention is to be construed as embracing each and every novel feature and novel combination of features present in and possessed by the apparatus and techniques herein disclosed and limited solely by the spirit and scope of the appended claims.

What is claimed is:

1. A facsimile transmission system having a facsimile transmitter for providing black and white information from an original document, the facsimile transmitter comprising, an electro-optical device for scanning the original document;

means coupled to the electro-optical device for deriving a modulating signal representing the information on the original document, said means causing the modulating signal to be a signal having a shifted reference level representing a shade of gray and causing the peak amplitude on one side of the reference level to represent maximum white and the peak amplitude on the other side of the reference level to represent maximum black;

a source providing a carrier signal; and modulator means having the carrier signal and the modulating signal applied to its inputs, the modulator means providing an amplitude modulated output signal whose carrier is shifted in phase whenever the modulating signal crosses said shifted reference level whereby the output of the modulator means is a signal whose carrier phase conveys information of blackness or whiteness and whose amplitude conveys information of the shade of black or white.

2. The facsimile transmission system according to claim 1, wherein the transmitter further comprises means for recurrently causing the signal output of the modulator means to simultaneously have a predetermined phase and peak amplitude.

3. The facsimile transmission system according to claim 2, wherein the modulator means comprises a balanced modulator which provides an amplitude modulated suppressed carrier output signal whose suppressed carrier exhibits 180° phase shifts.

4. The facsimile transmission system according to claim 3, wherein the transmitter further comprises transducer means coupled to the output of the balanced modulator for changing the electrical output signal to an acoustic signal conveying the same information.

5. The facsimile transmission system according to claim 4, further including a facsimile receiver comprising means for receiving the acoustic signal and converting that signal to recover the amplitude modulated suppressed carrier electrical signal, means for providing a first signal of the same frequency as the carrier signal of the balanced modulator, means responsive to the occurrence of the recurrent predetermined phase of the suppressed carrier in the recovered signal for causing the phase of the first signal to be brought into phase with the suppressed carrier whereby a phase controlled first signal is obtained, demodulating means responsive to the recovered amplitude modulated suppressed carrier signal and to the phase controlled first signal, the demodulating means providing a demodulated output signal, and marking means responsive to the demodulated output signal for producing a facsimile of the original document.

* * * * *